United States Patent
Hotta et al.

(10) Patent No.: US 10,584,227 B2
(45) Date of Patent: Mar. 10, 2020

(54) SILICONE RUBBER COMPOSITION AND POWER CABLE

(71) Applicant: SHIN-ETSU CHEMICAL CO., LTD., Tokyo (JP)

(72) Inventors: Masakatsu Hotta, Annaka (JP); Kazuhiro Oishi, Annaka (JP); Yoshiaki Koike, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 148 days.

(21) Appl. No.: 15/255,722

(22) Filed: Sep. 2, 2016

(65) Prior Publication Data

US 2017/0081499 A1    Mar. 23, 2017

(30) Foreign Application Priority Data

Sep. 17, 2015 (JP) ................................ 2015-184149

(51) Int. Cl.

| | | |
|---|---|---|
| C08K 3/36 | (2006.01) | |
| C08K 3/04 | (2006.01) | |
| C08K 5/14 | (2006.01) | |
| C08K 7/06 | (2006.01) | |
| C08K 9/06 | (2006.01) | |
| H01B 3/28 | (2006.01) | |

(52) U.S. Cl.
CPC ............... *C08K 3/36* (2013.01); *C08K 3/041* (2017.05); *C08K 5/14* (2013.01); *C08K 7/06* (2013.01); *C08K 9/06* (2013.01); *H01B 3/28* (2013.01); *C08K 2201/006* (2013.01)

(58) Field of Classification Search
CPC ... C08K 3/36; C08K 7/10; C08K 9/06; C08K 3/04; C08K 3/041; C08K 5/14; C08K 7/06; C08K 2201/006; H01B 3/28; C08G 77/02; C08G 77/04
USPC ........................................................ 524/493
See application file for complete search history.

(56) References Cited

U.S. PATENT DOCUMENTS

| | | | |
|---|---|---|---|
| 7,501,459 B2 | 3/2009 | Noguchi et al. | |
| 2001/0051673 A1* | 12/2001 | Suzuki | C08K 3/08 523/137 |
| 2007/0129492 A1* | 6/2007 | Colborn | B64C 1/1492 525/100 |
| 2008/0214688 A1* | 9/2008 | Hirabayashi | C08J 9/0004 521/95 |
| 2010/0308279 A1* | 12/2010 | Zhou | B82Y 30/00 252/511 |
| 2015/0344671 A1* | 12/2015 | Furukawa | C08L 83/08 310/366 |

FOREIGN PATENT DOCUMENTS

| | | | |
|---|---|---|---|
| EP | 2 495 285 A1 | 9/2012 | |
| JP | 2001-266680 A | 9/2001 | |
| JP | 4149413 B2 | 9/2008 | |
| JP | 4152672 B2 | 9/2008 | |
| JP | 4917164 B2 | 4/2012 | |
| JP | 2012188476 * | 4/2012 | ............. C08L 51/00 |
| JP | 5674143 B2 | 2/2015 | |
| JP | 2015-124330 A | 7/2015 | |
| JP | 2015-153514 A | 8/2015 | |

* cited by examiner

*Primary Examiner* — Ling Siu Choi
*Assistant Examiner* — Ronald Grinsted
(74) *Attorney, Agent, or Firm* — Birch, Stewart, Kolasch & Birch, LLP

(57) ABSTRACT

Disclosed herein are a silicone rubber composition and a power cable. The silicone rubber composition has excellent insulation properties and a high permittivity and which can further become a silicone dielectric material having a low specific gravity and a high strength. The power cable in which a terminal connection part or an intermediate connection part is composed of a cured molded product of the just-mentioned composition.

The silicone rubber composition includes (A) 100 parts by weight of an organopolysiloxane containing at least two Si-bonded alkenyl groups in one molecule thereof, (B) 5 to 50 parts by weight of a reinforcing silica having a specific surface area measured by a BET method of 50 $m^2/g$ to 400 $m^2/g$, (C) 0.3 to 3 parts by weight of carbon nanotubes having an average diameter of 0.5 nm to 50 nm, and (D) a curing agent in an amount necessary for curing of the composition. A cured molded product of the composition has a volume resistivity of at least $10^{10}$ Ω·cm and a relative permittivity of at least 5.

17 Claims, No Drawings

SILICONE RUBBER COMPOSITION AND POWER CABLE

CROSS-REFERENCE TO RELATED APPLICATION

This non-provisional application claims priority under 35 U.S.C. § 119(a) on Patent Application No. 2015-184149 filed in Japan on Sep. 17, 2015, the entire contents of which are hereby incorporated by reference.

TECHNICAL FIELD

The present invention relates to a silicone rubber composition suitable for use as a connection part of a power cable. Particularly, the present invention relates to a silicone rubber composition which gives a cured molded product having a volume resistivity of at least $10^{10}$ Ω·cm and a relative permittivity of at least 5, and a power cable in which an electric field relaxation layer of a terminal connection part or an intermediate connection part is composed of a cured molded product of the composition.

BACKGROUND ART

At a terminal connection part (terminal) or an intermediate connection part (joint) for a Crosslinked polyethylene-insulated Vinyl-sheathed power cable (CV cable), a measure for controlling or relieving the electric field stress at a cut and peeled end portion of an external semiconductor layer is needed. As such a measure, it has been practiced to mold a dielectric material such as a rubber composition having a higher permittivity than that of the cable insulator as an electric field relaxation layer between a conducting portion and an insulating portion at a terminal connection part or an intermediate connection part. This is a technology based on the utilization of a principle in which an equipotential line or electric stress is refracted when passing through substances which differ in permittivity.

As a dielectric material for use to form the electric field relaxation layer, there is known a dielectric material obtained by adding a carbon material such as carbon black to a polymeric material. This type of dielectric material has been unsuited to power cables, since the addition of the carbon material increases relative permittivity but would simultaneously impart conductivity. As a countermeasure against this problem, addition of silica-treated (silica-coated) carbon black to a silicone rubber composition has been proposed (Japanese Patent No. 4917164: Patent Document 1). Also, graft-bonding a vinyl polymer to carbon nanotubes has been proposed (Japanese Patent No. 5674143: Patent Document 2). In either of these techniques, however, it is necessary to form an insulating layer on surfaces of the carbon material before addition of the carbon material to the resin or rubber. Thus, these techniques are rather expensive in terms of materials cost and process cost.

As an approach other than the use of carbon materials, addition of a composite oxide of conductive zinc oxide and aluminum oxide to a silicone rubber composition has been proposed (Japanese Patent No. 4152672: Patent Document 3). In this case, however, it is necessary to add the composite oxide in a large amount, which leads to a raised specific gravity and a lowered strength. Further, composite insulator materials obtained by blending a high-permittivity substance such as barium titanate into a silicone rubber or an ethylene-propylene-diene copolymer have been proposed (JP-A 2001-266680: Patent Document 4). In this case, also, the problem of a raised specific gravity and a lowered strength is generated like in the above-mentioned cases.

Note that in related art of the present invention includes the following documents together with the above-mentioned.

CITATION LIST

Patent Document 1: Japanese Patent No. 4917164
Patent Document 2: Japanese Patent No. 5674143
Patent Document 3: Japanese Patent No. 4152672
Patent Document 4: JP-A 2001-266680
Patent Document 5: Japanese Patent No. 4149413
Patent Document 6: JP-A 2015-153514
Patent Document 7: JP-A 2015-124330

Thus, an object of the invention is to provide a silicone rubber composition which can become a silicone dielectric material having an excellent insulation properties and a high permittivity and further having a low specific gravity and a high strength. Another object of the invention is to provide a power cable in which an electric field relaxation layer at a terminal connection part or an intermediate connection part is composed of a cured molded product of the just-mentioned composition.

SUMMARY OF THE INVENTION

The present inventors made extensive and intensive investigations to attain the above-mentioned objects. As a result of the investigations, it has been found out that a silicone rubber composition containing an organopolysiloxane containing at least two silicon atom (Si)-bonded alkenyl groups in one molecule thereof, a reinforcing silica having a specific surface area measured by a BET method of 50 m²/g to 400 m²/g, carbon nanotubes having an average diameter of 0.5 nm to 50 nm and a curing agent provides a silicone dielectric material which achieves the above-mentioned objects.

Therefore, the present invention provides the following silicon rubber composition and power cable.

In one aspect, there is provided a silicone rubber composition including:

(A) 100 parts by weight of an organopolysiloxane containing at least two silicon atom-bonded alkenyl groups in one molecule thereof, (B) 5 to 50 parts by weight of a reinforcing silica having a specific surface area measured by a BET method of 50 m²/g to 400 m²/g, (C) 0.3 to 3 parts by weight of carbon nanotubes having an average diameter of 0.5 nm to 50 nm, and (D) a curing agent in an amount necessary for curing of the composition, wherein a cured molded product of the composition has a volume resistivity of at least $10^{10}$ Ω·cm and a relative permittivity of at least 5.

In the silicone rubber composition as above, preferably, the carbon nanotubes are multi-walled carbon nanotubes.

Preferably, the silicone rubber composition as above is for use as a connection part of a power cable.

In another aspect, there is. provided a power cable wherein an electric field relaxation layer of a terminal connection part or an intermediate connection part is composed of a cured molded product of the silicone rubber composition as above-mentioned.

ADVANTAGEOUS EFFECTS OF THE INVENTION

According to the silicone rubber composition in the present invention, it is possible to provide a silicone dielectric material which has a volume resistivity of at least $10^{10}$ Ω·cm and a relative permittivity of at least 5 and which has a low specific gravity and a high strength. The silicone rubber composition is applicable to a connection part of a power cable.

DESCRIPTION OF THE PREFERRED EMBODIMENTS

The present invention will be described in detail below.
(A) Organopolysiloxane

The organopolysiloxane having at least two Si-bonded alkenyl groups in one molecule thereof is a main agent (base polymer) for forming a silicone rubber composition. As the organopolysiloxane, an organopolysiloxane represented by the following average composition formula (I) can be used.

(In the formula, $R^1$ groups are identical or different non-substituted or substituted monovalent hydrocarbon groups having 1 to 10 carbon atoms, preferably 1 to 8 carbon atoms, and letter a is a positive number in the range of 1.5 to 2.8, preferably 1.8 to 2.5, and more preferably 1.9 to 2.1.)

Here, examples of the unsubstituted or substituted monovalent hydrocarbon groups represented by the Fe include alkyl groups such as methyl, ethyl, propyl, isopropyl, butyl, isobutyl, tert-butyl, pentyl, neopentyl, hexyl, cyclohexyl, octyl, nonyl, or decyl, aryl groups such as phenyl, tolyl, xylyl, or naphthyl, aralkyl groups such as benzyl, phenylethyl, or phenylpropyl, alkenyl groups such as vinyl, allyl, propenyl, isopropenyl, butenyl, hexenyl, cyclohexenyl, or octenyl, groups obtained by substituting part or all of hydrogen atoms of these groups with a halogen atom such as fluorine, bromine, or chlorine, or a cyano group, for example, chloromethyl, chloropropyl, bromoethyl, trifluoropropyl, or cyanoethyl. It is preferable that at least 90 mol % of all the $R^1$ groups, particularly, all the $R^1$ groups excepting the alkenyl groups are each a methyl group.

In addition, it is necessary that at least two of the $R^1$ groups are alkenyl groups (preferably alkenyl groups having 2 to 8 carbon atoms, more preferably alkenyl groups having 2 to 6 carbon atoms, and particularly vinyl groups), and the content of the alkenyl groups in the organopolysiloxane is preferably $1.0 \times 10^{-6}$ mol/g to $5.0 \times 10^{-3}$ mol/g, particularly $3.0 \times 10^{-6}$ mol/g to $1.0 \times 10^{-3}$ mol/g. If the amount of the alkenyl groups is less than $1.0 \times 10^{-6}$ mol/g, rubber harness may be low and it may be impossible to obtain sufficient strength. If the amount of the alkenyl groups is more than $5.0 \times 10^{-3}$ mol/g, on the other hand, crosslink density may be too high and the rubber may be brittle.

Note that the alkenyl groups may each be bonded to a silicon atom at a terminal end of the molecular chain, or may each be bonded to a silicon atom at an intermediate position of the molecular chain, or may be bonded to both of these silicon atoms. Preferably, the organopolysiloxane has alkenyl groups bonded to silicon atoms at both ends of the molecular chain at least.

Besides, while it is preferable for the organopolysiloxane to basically have a straight chain structure, the structure of the organopolysiloxane may be a branched structure, a cyclic structure, or a three-dimensional network structure. There is no particular limitation to the molecular weight of the organopolysiloxane. Thus, various organopolysiloxanes ranging from liquid ones having low viscosity at room temperature (25° C.) to crude rubber-like ones having high viscosity at room temperature can be used. However, it is preferable that the organopolysiloxane has a weight average polymerization degree of 100 to 20,000, particularly 200 to 10,000. If the weight average polymerization degree is less than 100, the silicone rubber composition may be so low in viscosity as to make it impossible to achieve sufficient shearing at the time of stirring, and make it impossible to achieve favorable dispersion of silica and carbon nanotubes. If the weight average polymerization degree exceeds 20,000, on the other hand, the silicone rubber composition may be so high in viscosity as to make it difficult to mold the composition. Note that the weight average polymerization degree can be determined as polystyrene basis weight average polymerization degree by gel permeation chromatography (GPC). Besides, the organopolysiloxane may be a mixture of two or more organopolysiloxanes that differ in molecular structure and/or weight average polymerization degree.

(B) Reinforcing Silica

The reinforcing silica of the component (B) is indispensable to imparting a sufficient strength to the silicone rubber. Examples of the reinforcing silica include fumed silica (dry type silica) and precipitated silica (wet type silica), and it is preferable to use fumed silica (dry type silica). The specific surface area, as measured by the BET method, of the silica fine powder for this purpose is 50 m$^2$/g to 400 m$^2$/g, preferably 100 m$^2$/g to 350 m$^2$/g. If the specific surface area is less than 50 m$^2$/g, the mechanical strength imparted to the rubber composition product is insufficient. If the specific surface area is above 400 m$^2$/g, on the other hand, the viscosity of the silicone rubber composition is so high that the composition is poor in handleability.

While the reinforcing silica may be used as it is, it is preferable to preliminarily treat the reinforcing silica with a surface hydrophobic treatment agent before use, or to use the reinforcing silica by treating it through addition of a surface treatment agent at the time of kneading it with the component (A). The surface treatment agent may be any of known ones such as alkylalkoxysilanes, alkylchlorosilanes, alkylsilazanes, silane coupling agents, titanate treatment agents, or fatty acid esters, which may be used singly or in combination of two or more of them used either simultaneously or at different timings.

Besides, the reinforcing silica also has a role of accelerating dispersion of carbon nanotubes. There has been a prior art (Japanese Patent No. 4149413: Patent Document 5) wherein by kneading an elastomer and carbon nanofibers by open rolls with a roll gap set to be narrow, it is possible to achieve stable and uniform mixing of the carbon nanofibers. By adding a predetermined amount of reinforcing silica to the mixture of the elastomer and the carbon nanofibers, uniform dispersion of carbon nanotubes can further be accelerated.

It is difficult to uniformly disperse a small amount of carbon nanotubes into a mixture of the component (A) and the component (B). Therefore, it is preferable to first add at least 10 parts by weight of carbon nanotubes to 100 parts by weight of the mixture of the component (A) and the component (B) to produce a high-concentration paste, and thereafter add the mixture of the component (A) and the component (B) to the paste to finish a composition having a predetermined concentration.

The amount of the reinforcing silica to be blended is 5 to 50 parts by weight, preferably 10 to 30 parts by weight, based on 100 parts by weight of the component (A). Where the reinforcing silica is blended in an amount of at least 5 parts by weight, a sufficient rubber strength can be obtained, and uniform dispersion of carbon nanotubes can be accelerated. If the blending amount of the reinforcing silica exceeds 50 parts by weight, however, the viscosity of the silicone rubber composition is raised to lead to poor handleability.

The component (B) may be used either singly or in combination of two or more components (B).

(C) Carbon Nanotubes

The carbon nanotubes of the component (C) are so-called carbon nanotubes, having an average diameter of 0.5 nm to 50 nm. Carbon nanotube has a hollow cylindrical shape formed by rolling graphite (graphene sheet) having a uniform planar structure. Here, multi-walled carbon nanotubes (double-walled carbon nanotubes having two layers in a rolled form or multi-walled carbon nanotubes having three or more layers in a rolled form) can be used.

The average diameter of the carbon nanotubes is 0.5 nm to 50 nm, preferably 5 nm to 30 nm. If the average diameter is less than 0.5 nm, enhancement of relative permittivity by addition of a small amount of carbon nanotubes cannot be observed. If the average diameter exceeds 50 nm, relative permittivity is not easily raised, since the carbon nanotubes are stiff and not easily bendable in structure. Besides, the average length of the carbon nanotubes is preferably 1 μm to 500 μm.

The amount of carbon nanotubes to be blended is 0.3 to 3 parts by weight, preferably 0.3 to 1.5 parts by weight, based on 100 parts by weight of the component (A). If the blending amount is less than 0.3 part by weight, a rise in relative permittivity cannot be expected. If the blending amount exceeds 3 parts by weight, volume resistivity is lowered.

In addition, relative permittivity and volume resistivity are most strongly influenced by the structure (diameter) of carbon nanotubes, and vary greatly upon addition of only a small amount of carbon nanotubes. Besides, the relative permittivity and volume resistivity are affected also by the particle diameter and blending amount of the reinforcing silica present between the carbon nanotubes. Therefore, the amount of carbon nanotubes blended in the silicone rubber composition is preferably finely controlled according to the kind of the carbon nanotubes, the addition amount of the reinforcing silica, and the like.

In adding carbon nanotubes to the mixture of the component (A) and the component (B), addition of the carbon nanotubes as they are is preferable from the viewpoint of manufacturing cost. However, a surface treatment agent may be added to the carbon nanotubes, like in the case of the reinforcing silica. The surface treatment agent may be any of known ones such as alkylalkoxysilanes, alkylchlorosilanes, alkylsilazanes, silane coupling agents, titanate treatment agents, or fatty acid esters, which may be used singly or in combination of two or more of them used either simultaneously or at different timings.

(D) Curing Agent

As the curing agent of the component (D), there can be used an organic peroxide curing agent or an addition reaction curing agent. Alternatively, co-vulcanization by use of both an organic peroxide curing agent and an addition reaction curing agent may be adopted.

Examples of the organic peroxide curing agent include, but are not particularly limited to, benzoyl peroxide, 2,4-dichlorobenzoyl peroxide, p-methylbenzoyl peroxide, o-methylbenzoyl peroxide, 2,4-dicumyl peroxide, 2,5-dimethyl-2,5-bis(t-butylperoxy)hexane, di-t-butyl peroxide, t-butyl perbenzoate, and 1,1-bis(t-butylperoxycarboxy)hexane.

The amount of the organic peroxide curing agent to be added may be appropriately selected according to a curing rate. Normally, the addition amount is 0.1 to 10 parts by weight, preferably 0.2 to 2 parts by weight, based on 100 parts by weight of the component (A). If the addition amount of the organic peroxide curing agent is too small, crosslinking may be insufficient and rubber properties such as strength and elongation may be poor. If the addition amount is too large, such problems as scorching and discoloration may be generated.

As the addition reaction curing agent, an organohydrogenpolysiloxane and a hydrosilylation catalyst are used in combination.

The organohydrogenpolysiloxane is an organohydrogenpolysiloxane having at least two, preferably three or more, Si-bonded hydrogen atoms (Si—H groups) in one molecule thereof, and is preferably an organohydrogenpolysiloxane which is represented by the following average composition formula (II):

$$R^2{}_b H_c SiO_{(4-b-c)/2} \qquad (II)$$

(In the formula, $R^2$ groups are identical or different unsubstituted or substituted monovalent hydrocarbon groups having 1 to 10 carbon atoms; letter b is a positive number of 0.7 to 2.1, and letter c is a positive number of 0.001 to 1, with b+c being 0.8 to 3.) and which is liquid at normal temperature.

Here, $R^2$ groups in the formula (II) are unsubstituted or substituted monovalent hydrocarbon groups having 1 to 10 carbon atoms, preferably 1 to 8 carbon atoms, may be identical or different, and preferably contain no aliphatic unsaturated bond. Specific examples of $R^2$ include alkyl groups such as methyl, ethyl, or propyl, cycloalkyl groups such as cyclohexyl, aryl groups such as phenyl or tolyl, aralkyl groups such as benzyl, 2-phenylethyl, or 2-phenylpropyl, and groups obtained by substituting part or all of hydrogen atoms of these groups with a halogen atom, for example, 3,3,3-trifluoropropyl.

Besides, letter b is a positive number of 0.7 to 2.1, preferably 0.8 to 2, letter c is a positive number of 0.001 to 1, preferably 0.01 to 1, with b c being 0.8 to 3, preferably 0.9 to 2.7.

The organohydrogenpolysiloxane has at least two (normally, 2 to 300), preferably at least three (for example, 3 to approximately 200), more preferably at least four (for example, 4 to approximately 100) Si—H groups in one molecule thereof, and these Si—H groups may be present at a terminal end of the molecular chain, at an intermediate position of the molecular chain, or at both a terminal end and an intermediate position of the molecular chain. In addition, the organohydrogenpolysiloxane may be one in which the number of silicon atoms in its molecule (or the polymerization degree) is normally about 2 to 300, preferably about 3 to 200, more preferably about 4 to 100, and its viscosity at 25° C. is 0.5 mPa·s to 1,000 mPa·s, preferably 1 mPa·s to 500 mPa·s, particularly preferably 5 mP·s to 300 mPa·s. Note that the viscosity can be measured by a rotational viscometer (for example, BL type, BH type, BS type, or cone plate type) (the same applies hereinafter).

Examples of the organohydrogenpolysiloxane include 1,1,3,3-tetramethyldisiloxane,
1,3,5,7-tetramethylcyclotetrasiloxane,
methylhydrogencyclopolysiloxane,
methylhydrogensiloxane-dimethylsiloxane cyclic copolymer,
tris(dimethylhydrogensiloxy)methylsilane,
tris(dimethylhydrogensiloxy)phenylsilane,
both end trimethylsiloxy-blocked methylhydrogenpolysiloxane, both end trimethylsiloxy-blocked dimethylsiloxane-methylhydrogensiloxane copolymer,
both end dimethylhydorgensiloxy-blocked methylhydrogenpolysiloxane,
both end dimethylhydrogensiloxy-blocked dimethylpolysiloxane,
both end dimethylhydrogensiloxy-blocked dimethylsiloxane-methylhydrogensiloxane copolymer,
both end trimethylsiloxy-blocked methylhydrogensiloxane-diphenylsiloxane copolymer,
both end trimethylsiloxy-blocked methylhydrogensiloxane-diphenylsiloxane-dimethylsiloxane copolymer,
copolymers composed of $(CH_3)_2HSiO_{1/2}$ units and $SiO_{4/2}$ units,
copolymers composed of $(CH_3)_2HSiO_{1/2}$ units and $SiO_{412}$ units, and $(C_6H_5)SiO_{3/2}$ units, and
organohydrogenpolysiloxanes obtained by substituting part or all of methyl groups of these compounds with other alkyl group or phenyl group.

The amount of the organohydrogenpolysiloxane to be blended when used is preferably 0.1 to 30 parts by weight, particularly 0.3 to 10 parts by weight, based on 100 parts by weight of the organopolysiloxane of the component (A). Besides, the organohydrogenpolysiloxane can also be blended in such a manner that the molar ratio of its Si-H groups to the total of the alkenyl groups in the component (A) is normally in the range from about 0.5 to 5, preferably from about 0.8 to 3, more preferably from about 1 to 2.5. If the amount of the organohydrogenpolysiloxane blended is too small, crosslinking may be insufficient and such rubber properties as strength and elongation may be poor. If the blending amount of the organohydrogenpolysiloxane is too large, the points of crosslink may be too many (the crosslink density may be too high) and rubber properties may be poor again.

Examples of the hydrosilylation catalyst include platinum black, platinic chloride, chloroplatinic acid, a reaction product of chloroplatinic acid with a monohydric alcohol, complexes of chloroplatinic acid with olefins, platinum bisacetoacetate, palladium catalysts, and rhodium catalysts.

Note that the amount of the hydrosilylation catalyst to be blended when used can be a catalytic amount. The amount of the hydrosilylation catalyst, in terms of weight of platinum metal, is normally in the range of 0.5 ppm to 1,000 ppm, particularly 1 ppm to 500 ppm, based on the amount of the component (A).

The silicone rubber composition of the present invention may be admixed, if necessary, with other components than the above-mentioned. Examples of the other components include reinforcing agents such as silicone resin, fillers such as quartz powder, diatomaceous earth, or calcium carbonate, hydrosilylation reaction controlling agents such as nitrogen-containing compounds, acetylene compounds, phosphorus compounds, nitrile compounds, carboxylates, tin compounds, mercury compounds, sulfur compounds, or ethynylcyclohexanol, heat resisting agents such as iron oxide or cerium oxide, internal mold release agents such as dimethylsilicone oil, adhesiveness imparting agents, and thixotropy imparting agents, and they can be blended in such ranges as not impair the object of the present invention.

The curing temperature of the silicone rubber composition of the present invention can be appropriately selected in a temperature range from room temperature (25° C.) to a high temperature. The curing is normally conducted at 100° C. to 220° C. for about 10 seconds to two hours, preferably at 120° C. to 200° C. for about 20 seconds to 30 minutes. In addition, after curing and molding (namely, after primary curing) of the silicone rubber composition, postcure (secondary curing) may be carried out for the purpose of enhancing adhesion properties or permanent compression set of the cured product. The postcure is conducted normally at 100° C. to 220° C. for about 30 minutes to 100 hours, preferably at 120° C. to 200° C. for about one hour to eight hours.

A cured molded product of the silicone rubber composition of the present invention has a volume resistivity of at least $10^{10}$ Ω·cm, preferably $10^{10}$ Ω·cm to $10^{17}$ Ω·cm.

Besides, it has a relative permittivity of at least 5, preferably 5 to 50. If the volume resistivity is less than $10^{10}$ Ω·cm, sufficient insulation properties cannot be secured when the cured molded product of the silicone rubber composition is used as an intermediate connection member or a terminal connection member of a power cable. If the permittivity is less than 5, sufficient properties cannot be obtained when the cured molded product of the silicone rubber composition is used as an electric field relaxation member for an intermediate connection part or a terminal connection part of a power cable. Here, the volume resistivity is determined by preparing a 1 mm thick molded sheet cut to be 100 mm in length and in width, and measuring the volume resistivity by a double ring electrode method according to JIS K 6271. On the other hand, the relative permittivity is determined by preparing a 1 mm thick molded sheet cut to be 100 mm in length and in width, and measuring the relative permittivity by a relative permittivity measuring method according to JIS K 6249.

Note that the cured molded product of the silicone rubber composition of the present invention can be made to have the above-mentioned volume resistivity and relative permittivity by appropriately controlling the kind and addition amount of the carbon nanotubes and the particle diameter and addition amount of the reinforcing silica in the silicone rubber composition.

The silicone rubber composition of the present invention has excellent insulation properties and a high permittivity and can yield a cured product having a low specific gravity and a high strength. Therefore, the silicone rubber composition is useful for connection parts of power cables. Particularly, the silicone rubber composition of the present invention is suitable for use as a silicone dielectric material for forming an electric field relaxation layer provided between a conducting portion and an insulating portion in a terminal connection part or an intermediate connection part of a power cable.

In this case, the electric field relaxation layer using the silicone rubber composition of the present invention can be molded by a known method, such as extrusion molding (wherein the silicone rubber composition is molded into a hollow cylindrical shape and then a wire is passed therethrough) or insert molding (wherein the silicone rubber composition is molded directly around a wire).

EXAMPLES

The present invention will be described specifically below by showing Examples and Comparative Examples, but the present invention is not to be limited to the following Examples.

Examples 1 and 2

(A) 100 parts by weight of an organopolysiloxane composed of 99.9 mol % of dimethylsiloxane units, 0.075 mol % of methylvinylsiloxane units, and 0.025 mol % of dimethylvinylsiloxane units and having a weight average polymerization degree of approximately 6,000, (B) 25 parts by weight of fumed silica (AEROSIL 200, manufactured by Nippon Aerosil Co., Ltd.) having a specific surface area measured by a BET method of 200 m$^2$/g, 4 parts by weight of dimethyldimethoxysilane as a surface treatment agent, 0.15 part by weight of methylvinyldimethoxysilane, and 1 part by weight of hydrochloric acid (pH=3) were kneaded by a kneader, and heat treated at 180° C. for one hour, to obtain a base compound.

To 100 parts by weight of the base compound, (C) carbon nanotubes (FloTube 9100, manufactured by CNano Technology Limited) having an average diameter of 10 nm to 15 nm and an average length of 10 μm were added in amounts shown in Table 1, followed by mixing by a two-roll mill until uniform mixtures were formed, to prepare silicone rubber compositions shown in Table 1.

To 100 parts by weight of each of the thus obtained compositions, (D) 0.5 part by weight of 2,5-dimethyl-2,5-bis(t-butylperoxy)hexane was blended as a curing agent by a two-roll mill, press cure was conducted at 165° C. and 10 MPa for 10 minutes, and post cure was performed in an oven at 200° C. for four hours, to produce a sheet.

Comparative Example 1 and 2

Sheets were produced in the same manner as above, except that the amount of carbon nanotubes in Example 1 was changed to the amounts set forth in Table 1.

Comparative Example 3

A sheet was produced in the same manner as above, except that 300 parts by weight of barium titanate (average particle diameter 0.8 μm, manufactured by Kishida Chemical Co., Ltd.) was added in place of the carbon nanotubes in Example 1.

The thus obtained sheets were subjected to evaluation of properties. Methods of evaluation are shown below. The results of evaluation are also set forth in Table 1 below.

Density, hardness, and volume resistivity were measured according to JIS K 6249.

Relative permittivity was measured by use of "Automatic Schering Bridge DAC-1M-D1" manufactured by Soken Electric Co., Ltd. Electrodes used were a main electrode of 50 mm in diameter, a guard electrode of 54 mm by 80 mm in diameter, and a counter electrode of 80 mm in diameter, and measurement was conducted at a frequency of 50 Hz.

TABLE 1

|  | Example | | Comparative Example | | |
|---|---|---|---|---|---|
|  | 1 | 2 | 1 | 2 | 3 |
| Base compound (pbw) | 100 | 100 | 100 | 100 | 100 |
| Carbon nanotubes (pbw) | 0.5 | 1.0 | 0 | 5.0 |  |
| Barium titanate (pbw) |  |  |  |  | 300 |
| Density (g/cm$^3$) | 1.10 | 1.10 | 1.10 | 1.10 | 2.81 |
| Hardness (durometer type A) | 40 | 42 | 38 | 50 | 68 |
| Relative permittivity (50 Hz) | 5.1 | 29.6 | 3.6 | not measurable (conduction region) | 12.0 |
| Volume resistivity (Ω · cm) | 7.2 × 10$^{16}$ | 2.9 × 10$^{16}$ | 8.3 × 10$^{16}$ | 5.5 × 10$^6$ | 1.6 × 10$^{15}$ |

Japanese Patent Application No. 2015-184149 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A dielectric material consisting of a cured molded product of a silicone rubber composition consisting of:
    (A) 100 parts by weight of an organopolysiloxane containing at least two silicon atom-bonded alkenyl groups in one molecule thereof,
    (B) 5 to 50 parts by weight of a reinforcing silica having a specific surface area measured by a BET method of 50 m$^2$/g to 400$^2$/g,
    (C) 0.3 to 3 parts by weight of carbon nanotubes having an average diameter of 5 nm to 50 nm, and
    (D) a curing agent in an amount necessary for curing of the composition,
    wherein the dielectric material has a volume resistivity of at least 10$^{10}$ Ω·cm and a relative permittivity of at least 5.

2. The dielectric material according to claim 1, wherein the carbon nanotubes are multi-walled carbon nanotubes.

3. The dielectric material according to claim 1 which is for use as a connection part of a power cable.

4. A power cable having an electric field relaxation layer at a terminal connection part or an intermediate connection part, the electric field relaxation layer comprising a dielectric material of a cured molded product of a silicone rubber composition,
    wherein the silicone rubber composition comprises:
    (A) 100 parts by weight of an organopolysiloxane containing at least two silicon atom-bonded alkenyl groups in one molecule thereof,
    (B) 5 to 50 parts by weight of a reinforcing silica having a specific surface area measured by a BET method of 50 m$^2$/g to 400 m$^2$/g,
    (C) 0.3 to 3 parts by weight of carbon nanotubes having an average diameter of 5 nm to 50 nm ,and
    (D) a curing agent in an amount necessary for curing of the composition,
    wherein the dielectric material has a volume resistivity of at least 10$^{10}$ Ω·cm and a relative permittivity of at least 5.

5. The dielectric material of claim 1, wherein the organopolysiloxane as component (A) is represented by the following average composition formula (I)

$$R^1_a SiO_{(4-a)/2} \quad (I)$$

wherein $R^1$ is identical or different, non-substituted or substituted, monovalent hydrocarbon group having 1 to 10 carbon atoms, and letter a is a positive number in the range of 1.5 to 2.8.

6. The dielectric material of claim 1, wherein the curing agent as component (D) is selected from among an organic peroxide curing agent, an addition reaction curing agent, and a combination of an organic peroxide and an addition reaction curing agent.

7. The dielectric material of claim 6, wherein the addition reaction curing agent is a combination of an organohydrogenpolysiloxane and a hydrosilylation catalyst, wherein the organohydrogenpolysiloxane is represented by the following average composition formula (II):

$$R^2{}_bH_cSiO_{(4-b-c)/2} \qquad (II)$$

wherein $R^2$ is identical or different, unsubstituted or substituted monovalent hydrocarbon group having 1 to 10 carbon atoms; letter b is a positive number of 07 to 2.1, and letter c is a positive number of 0.001 to 1, with b+c being 0.8 to 3, and which is liquid at normal temperature.

8. The power cable according to claim 4, wherein the silicone rubber composition comprises primarily:
(A) 100 parts by weight of the organopolysiloxane;
(B) 5 to 50 parts by weight of the reinforcing silica;
(C) 0.3 to 3 parts by weight of the carbon nanotubes; and
(D) the curing agent.

9. The power cable according to claim 4, wherein the silicone rubber composition consists essentially of:
(A) 100 parts by weight of the organopolysiloxane;
(B) 5 to 50 parts by weight of the reinforcing silica;
(C) 0.3 to 3 parts by weight of the carbon nanotubes; and
(D) the curing agent.

10. The power cable according to claim 4, wherein barium titanate particles are not included in the silicone rubber composition.

11. The power cable according to claim 4, wherein any dielectric inorganic fine particles are not included in the silicone rubber composition.

12. The power cable according to claim 4, consisting essentially of (A), (B), (C) and (D).

13. The power cable according to claim 4, consisting of (A), (B), (C) and (D).

14. The power cable according to claim 4, wherein the carbon nanotubes are multi-walled carbon nanotubes.

15. The power cable according to claim 4, wherein the organopolysiloxane as component (A) is represented by the following average composition formula (I)

$$R^1{}_aSiO_{(4-a)/2} \qquad (I)$$

wherein $R^1$ is identical or different, non-substituted or substituted, monovalent hydrocarbon group having 1 to 10 carbon atoms, and letter a is a positive number in the range of 1.5 to 2.8.

16. Power cable according to claim 4, wherein the curing agent as component (D) is selected from among an organic peroxide curing agent, an addition reaction curing agent, and a combination of an organic peroxide and an addition reaction curing agent.

17. The power cable according to claim 16, wherein the addition reaction curing agent is a combination of an organohydrogenpolysiloxane and a hydrosilylation catalyst, wherein the organohydrogenpolysiloxane is represented by the following average composition formula (II):

$$R^2{}_bH_cSiO_{(4-b-c)/2} \qquad (II)$$

wherein $R^2$ is identical or different, unsubstituted or substituted monovalent hydrocarbon group having 1 to 10 carbon atoms; letter b is a positive number of 0.7 to 2.1, and letter c is a positive number of 0.001 to 1, with b+c being 0.8 to 3, and which is liquid at normal temperature.

* * * * *